(12) United States Patent
Meyer et al.

(10) Patent No.: US 6,460,435 B1
(45) Date of Patent: Oct. 8, 2002

(54) METHOD OF ROTATIONAL THREAD MILLING AND A THREAD MILLING CUTTER FOR USE THEREWITH

(75) Inventors: Ernst Meyer, Lauf (DE); Helmut Glimpel, Lauf (DE)

(73) Assignee: EMUGE-Werk Richard Glimpel Fabrik für Präzisionswerkzeuge vormals Moschkau & Glimpel (DE)

( * ) Notice: Subject to any disclaimer, the term of this patent is extended or adjusted under 35 U.S.C. 154(b) by 0 days.

(21) Appl. No.: 09/604,453

(22) Filed: Jun. 27, 2000

(30) Foreign Application Priority Data

Jul. 2, 1999 (DE) .......................... 199 30 617

(51) Int. Cl.$^7$ ............... B23B 1/00; B23G 1/34
(52) U.S. Cl. ............... 82/1.11; 82/1.2; 82/82; 82/110; 409/66
(58) Field of Search ............... 82/1.11, 1.2, 82, 82/110, 111; 407/24, 27; 408/222; 409/66

(56) References Cited

U.S. PATENT DOCUMENTS

| 5,098,232 A | * | 3/1992 | Benson .................. 407/33 |
| 5,104,268 A | * | 4/1992 | Kitagawa et al. ........ 409/66 |
| 5,733,078 A | * | 3/1998 | Matsushita et al. ...... 409/74 |
| 6,257,810 B1 | * | 7/2001 | Schmitt .................. 409/66 |

* cited by examiner

Primary Examiner—Henry Tsai
(74) Attorney, Agent, or Firm—Sidley Austin Brown & Wood, LLP

(57) ABSTRACT

A method of rotational milling of a thread on a workpiece and including providing a device having a rotatable workpiece spindle for supporting the workpiece and a rotatable milling cutter spindle for supporting a thread milling cutter, and displacing axially the workpiece spindle and the milling cutter relative to each other by a distance shorter than a length of the thread, while rotating the workpiece spindle and the milling cutter spindle with respective rotational speeds a ratio of which is not equal to 1; and displacing radially the workpiece spindle and the milling cutter spindle relative to each other.

7 Claims, 2 Drawing Sheets

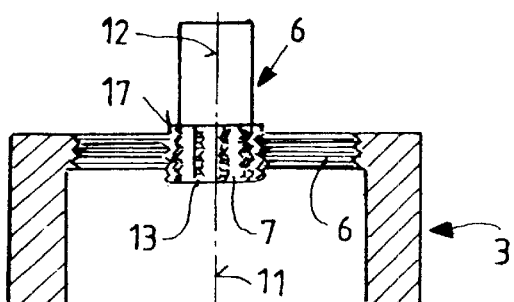
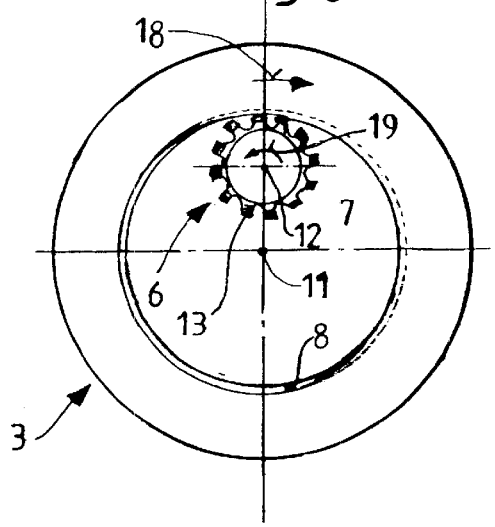
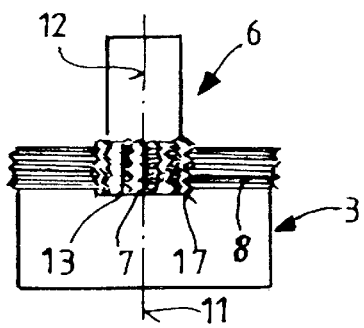
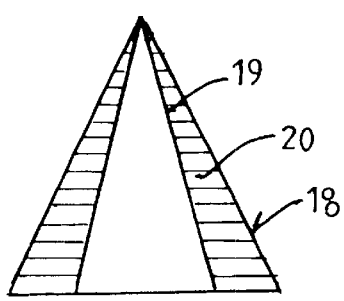
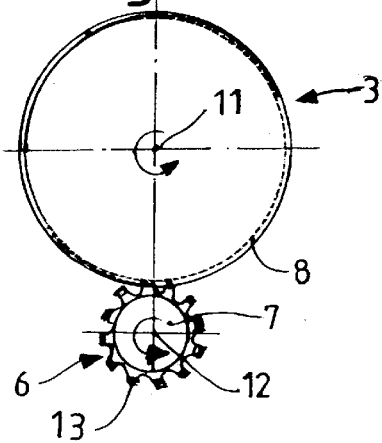

METHOD OF ROTATIONAL THREAD MILLING AND A THREAD MILLING CUTTER FOR USE THEREWITH

BACKGROUND OF THE INVENTION

1. Field of the Invention

The present invention relates to a method of milling a thread and including providing a device having a rotatable workpiece spindle for supporting a workpiece on which a thread is to be milled, and a rotatable milling cutter spindle for supporting a thread milling cutter having a work region for milling the thread on the workpiece and provided with teeth having a tooth profile corresponding to a thread profile of the to-be-milled thread, with the workpiece spindle and the milling cutter spindle having their rotational axes extending parallel to each other, and displacing axially the workpiece spindle and the milling cutter spindle relative to each other, while rotating the workpiece spindle and the milling cutter spindle with respective rotary speeds a ratio of which is not equal to 1.

The present invention also relates to a thread milling cutter having a work region with rows of teeth having a tooth profile corresponding to the thread profile of the to-be-milled thread.

2. Description of the Prior Art

The above-described method and apparatus for effecting the method are disclosed in Swiss Document No. 666,429. According to the disclosed method, the workpiece spindle and the milling cutter spindle move relative to each other during a thread milling operation only axially, with the thread million cutter gradually penetrating axially into the workpiece. In order to form a thread having a predetermined length, the work region of the cutter has a shorter length than the length of the to-be-milled thread, and the axial displacement is at least as long as the thread length and, as a rule, exceeds the thread length. The thread is formed during the axial displacement of the cutter, and the time of the axial displacement is relatively large with respect to the displacement distance.

Accordingly, an object of the present invention is to provide a method of thread milling as described above with a shorter duration of the axial displacement of the workpiece and milling cutter spindles relative to each other.

SUMMARY OF THE INVENTION

This and other objects of the present invention, which will become apparent hereinafter, are achieved, according to the present invention by displacing the workpiece and the milling cutter spindles radially relative to each other, and by making the distance of the axial displacement shorter than the thread length.

With the inventive method, the thread milling takes place essentially as a result of radial displacement of the workpiece spindle and the milling cutter spindle. The complete length of the to-be-milled thread is obtained as a result of a radial feed of the thread milling cutter which generally accelerates the entire process of the thread milling. The thread milling effected by the inventive method permits to form the thread in two-three times more rapidly than with the method disclosed in the above-mentioned Swiss Patent. The work region of the thread milling cutter used in the inventive method has a length which is at least equal to the length of the to-be-milled thread. The axial displacement according to the inventive method is effected with a ratio of rational speeds of the workpiece and milling cutter spindles deviating from 1 in order to obtain an exactly round and smooth thread. The radial displacement depends on the rotational speed of the workpiece. The present invention consists in the use of a radial feed of the thread milling cutter for effecting thread milling of the rotatable workpiece. The produced chips have an advantageous shape, and the process is characterized by a favorable loading of the thread milling cutter.

The inventive method does not require an angular positioning of the thread milling cutter relative to the workpiece. This permits to use thread milling cutters having a longer work region and permits to mill longer threads. The threads can be milled up to the depth limit. Because of the rotation of the workpiece, the orbital movement of the thread milling cutter is eliminated. The teeth of the thread milling cutter are arranged about the milling axis with a gradient. The inventive method can be used for milling both outer and inner threads. The ratio of rotational speeds of the workpiece and milling cutter spindles varies in a range from 0.8:1 to 1.2:1 and, preferably, in the range from 0.95:1 to 1.05:1. In the later case, a particularly smooth surface of the thread is obtained. However the ratio cannot be 1:1. It is unimportant which of the workpiece spindle and the milling cutter spindle rotates with the larger or smaller speed. Therefore, the speed ratio remains constant during the thread milling process, and the ratio 1:1 never occurs. The rotational speeds are selected dependent on the workpiece. The cutting speed is the same as with the known method. In the point of engagement of the thread milling cutter with the workpiece, they rotate in opposite directions.

It is particularly preferable and advantageous when the radial displacement of the workpiece and milling cutter spindle is effected with the ratio of their rotational speeds being equal 1, and then the axial displacement takes place. During the radial feed, the teeth of the thread milling cutter are loaded uniformly.

It is particularly preferable and advantageous when both the radian and axial displacement takes place simultaneously. This reduces the milling process as the readjusting of the milling device is eliminated.

It is particularly preferable and advantageous when the axial displacement of the workpiece and milling cutter spindles are at least equal to the pitch of the thread divided by the number of teeth arranged about the circumference of the work region of the thread milling cutter. As a rule, the axial displacement is equal to this value. In this case, the axial displacement is minimal.

The present invention is characterized in that the tooth profile of the teeth of the work region of the thread milling cutter differs from the thread profile of the to-be-milled thread, and the tooth profile is corrected with respect to the thread, and the teeth are arranged with a respective pitch. The type and the amount of the deviation of the tooth profile from the milled thread profile, because of the parallelism of the workpiece and milling cutter axes, is determined by the pitch of the to-be-milled thread.

With respect to the correction of compensation of the tooth profile, the following can be said. The thread milling cutter or the thread-forming teeth of the cutter rotate in a plane that is not identical with the plane which in each arbitrary infinitesimal small point extends parallel to the produced workpiece profile. Therefore, the outline of cutter profile geometry in the normal plane (perpendicular to the pitch) does not coincide with the workpiece geometry in this plane. Rather, the cutter profile geometry, because of difference of the directions of the operational planes, would be projected onto the workpiece. In order to obtain a desired geometry, the cutter geometry should deviate from the projection of the cutter profile geometry by a projection identical in magnitude but having an opposite direction. Thus, the cutter and the workpiece have different geometries in the normal plane. Thus, the cutter profile geometry is determined by the to-be-produced workpiece profile geometry and by the projection of the position of the operational planes. This process is called profile compensation.

The thread milling cutter according to the present invention is determined by its own shape and by additional data which are given on the cutter itself and/or are printed on the cutter package, accompanying document, or prospectus. The additional data includes the thread profile of the to-be-milled thread with respect to which the tooth profile is corrected, and an indication that the cutter can be used in a thread milling device having only four axes (and no additional inclination axes). Thus, the thread milling cutter according to the invention is adapted for use in a thread milling device having two parallel rotational axes and two feeding directions.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 7 a schematic plan cross-sectional view showing an arrangement of a second workpiece and a second thread milling cutter in the device shown in FIG. 1 in a second position after thread milling;

FIG. 8 a side view of the arrangement shown in FIG. 7;

FIG. 9 a schematic plan view showing an arrangement of a third workpiece and a third milling cutter for the device shown in FIG. 1 in a second position after thread milling;

FIG. 10 a side view of the arrangement shown in FIG. 9; and

FIG. 11 a view showing a tooth profile and an associated thread profile.

DETAILED DESCRIPTION OF THE PREFERRED EMBODIMENTS

Figure 1:
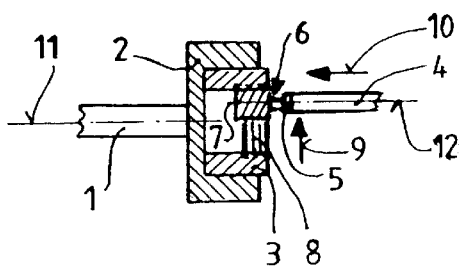
FIG. 1 a schematic, side cross-sectional view of a device for rotational thread milling.

A device for thread million according to the present invention, which is shown in FIG. 1, includes a workpiece spindle 1, a clamp 2 mounted on the workpiece spindle 1 for holding a workpiece 3, and a milling cutter spindle 4 provided with a clamp 5 for holding a thread milling cutter 6. The milling cutter 6 has a work region 7. The work region 7 of the milling cutter 6 mills a thread 8 on the workpiece 3 while the milling cutter spindle 4 moves in a radial direction 9 and in an axial direction 10, as shown by respective arrows. The axis 11 of he workpiece spindle 1 and, thus, of the workpiece 3, and the axis 12 of the milling cutter spindle 4 and, thus, of the thread milling cutter 6 and its work region 7 extend parallel to each other. The work region 7 of the thread milling cutter 6 is provided with teeth 13.

Figure 4:
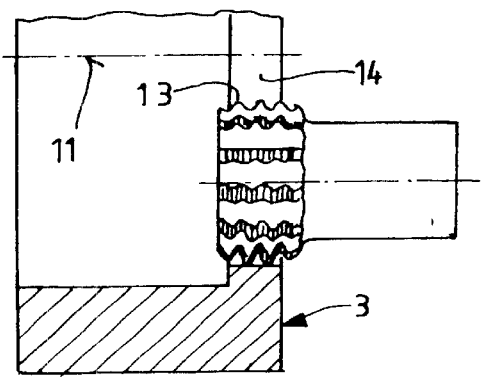
FIG. 4 a schematic cross-sectional view showing the workpiece and the milling cutter shown in FIG. 2 in a first position before the start of thread milling.
Figure 2:
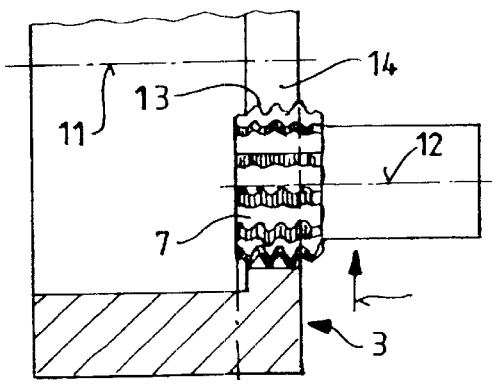
FIG. 2 a schematic cross-sectional view showing an arrangement of a workpiece and a thread milling cutter in the device shown in FIG. 1 in a first position before the start of thread milling.
Figure 5:
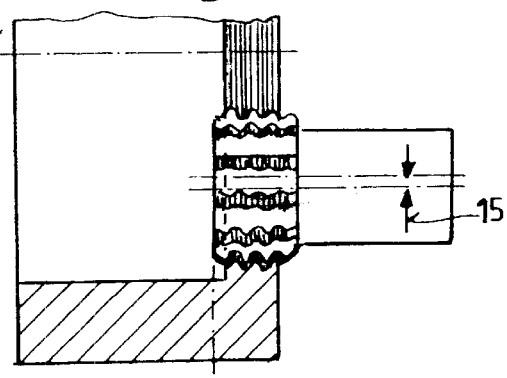
FIG. 5 a schematic cross-sectional view showing the workpiece and the milling cutter shown in FIG. 4 in an intermediate position with only a partially milled thread.
Figure 6:
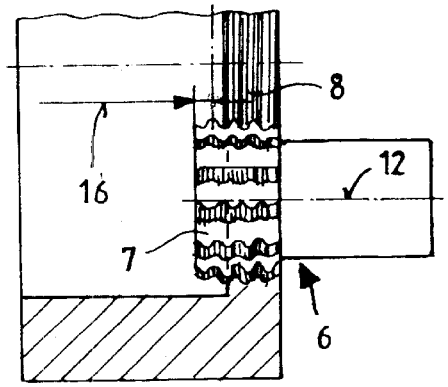
FIG. 6 a schematic cross-sectional view showing the workpiece and the milling cutter shown in FIG. 4, in a second position after thread milling.

In the first position, before the start of the thread milling, which is shown in FIG. 2, the thread milling cutter 6 is positioned relative to the workpiece 3 or a strip 14 in which the thread should be milled. Simultaneously, the thread milling cutter 6 is fed by an amount 15 in the radial direction and by an amount 16 in the axial direction, and it reaches the position shown in FIG. 3 in which the thread 8 had been milled in the strip 14. In the embodiment shown in FIGS. 4–6, the thread milling cutter is fed only in the radial direction by the amount 15 and is brought into an intermediate position shown in FIG. 5. Then, the thread milling cutter is fed by the amount 16 in the axial direction and is brought in a second position shown in FIG. 6

Figure 3:
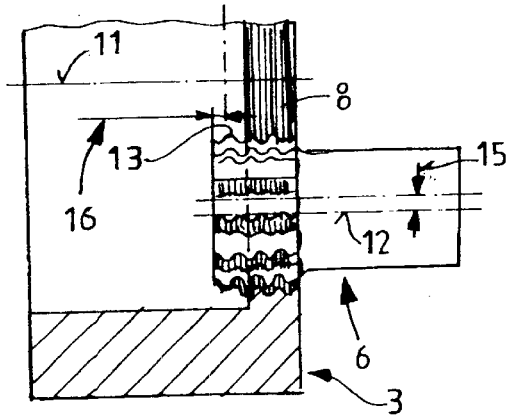
FIG. 3 a schematic cross-sectional view showing the workpiece and the milling cutter shown in FIG. 2 in a second position after thread milling.

FIGS. 7 and 8 clarify the arrangement of the workpiece 3 and the thread milling cutter 6 shown in FIGS. 2–3. The work region 7 of the thread milling cutter 6 is provided, at both ends, with a notch 17. According to FIG. 8, the workpiece 3 rotates in a clockwise direction 18, and the thread milling cutter 6 rotates in an anticlockwise direction 19. Thus, the workpiece 3 and the thread milling cutter 6 rotate in opposite directions. Whereas FIGS. 1–8 show relationships for milling an internal thread 8, FIGS. 9–10 show relationships for milling an external thread.

According to FIG. 11, for milling a thread profile 18 of the thread 8, the teeth 13 are provided with a tooth profile 19 the deviation of which from the thread profile 18 is shown with hatched lines 20.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed:

1. A method of rotational milling of a thread on a workpiece, comprising the steps of:

providing a device having a rotatable workpiece spindle for supporting the workpiece on which a thread is to be milled, and a rotatable milling cutter spindle for supporting a thread milling cutter having a work region for milling the thread on the workpiece and provided with teeth having a tooth profile corresponding to a thread profile of the to-be-milled thread, the workpiece spindle and the milling cutter spindle having rotational axes thereof extending parallel to each other;

displacing axially the workpiece spindle with the workpiece and the milling cutter spindle with the milling cutter relative to each other by a distance shorter than a length of the thread, while rotating the workpiece spindle and the milling cutter spindle with respective rotary speeds a ratio of which varies from 0.8:1 to 1.2:1 and is not equal to 1:1, and displacing radially the workpiece spindle and the milling cutter spindle relative to each other for milling the thread on the workpiece.

2. A method as set forth in claims 1, wherein the radially displacing step comprises radially displacing the workpiece spindle and the milling cutter spindle after an axial displacement thereof.

3. A method as set forth in claim 1, wherein the axially displacing step and the radially displacing step are effected simultaneously.

4. A method as set forth in claim 1, wherein the axially displacing step is effected while rotating the workpiece spindle and the milling cutter spindle with rotational speeds the ratio of which varies from 0.95:1 to 1.05:1 and is not equal to 1:1.

5. A method as set forth in claim 1, comprising the step of providing a thread milling cutter having a notch at least at one end of the work region.

6. A method as set forth in claim 1, wherein the axially displacing step comprises displacing the workpiece spindle and the milling cutter spindle relative to each other at least by a distance equal to a pitch of the thread divided by a number of teeth provided around a circumference of the work region of the thread milling cutter.

7. A method as set forth in claim 1, wherein the thread milling cutter has a work region, and a plurality of rows of teeth formed on the work region and having a tooth profile of the teeth different from the thread profile of the to-be-milled thread according to a profile compensation, and wherein the teeth are arranged under the pitch.

* * * * *